Dec. 1, 1959 G. L. A. DEVOS 2,914,931
HOMOKINETIC UNIVERSAL JOINT
Filed July 23, 1957 2 Sheets-Sheet 1

Inventor
Gaston Louis Arthur Devos
by Stevens, Davis Miller & Mosher
his attorneys

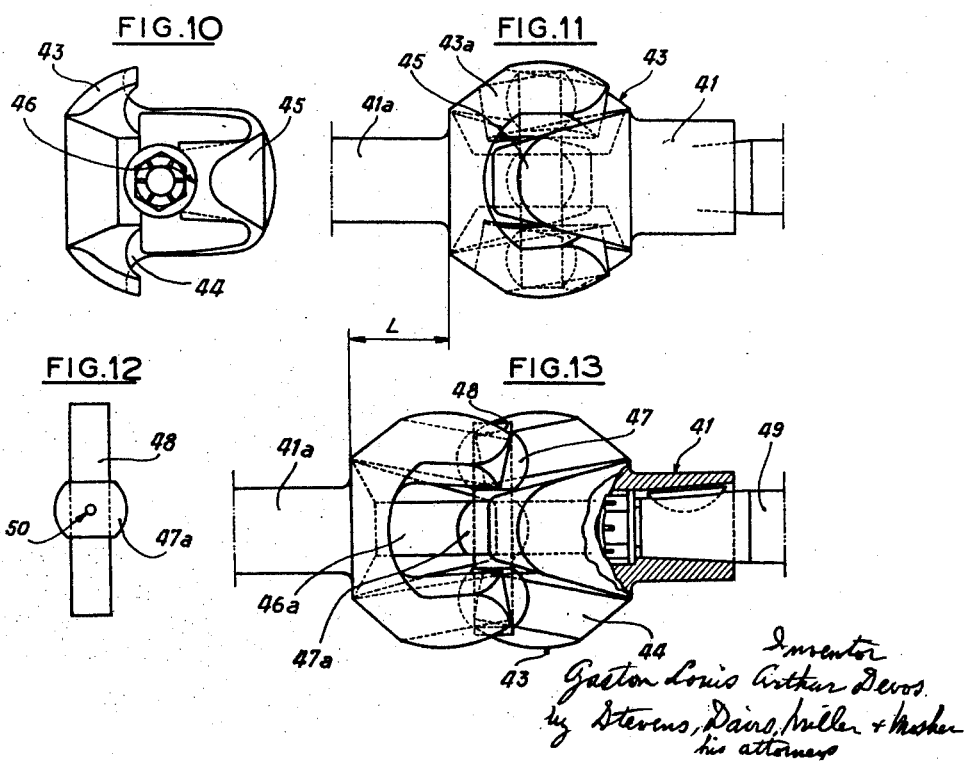

United States Patent Office 2,914,931
Patented Dec. 1, 1959

2,914,931

HOMOKINETIC UNIVERSAL JOINT

Gaston Louis Arthur Devos, Paris, France

Application July 23, 1957, Serial No. 673,717

Claims priority, application France August 27, 1956

5 Claims. (Cl. 64—21)

This invention relates in general to homokinetic universal joints, that is, couplings adapted to connecting shafts rotating at an angle which is either constant or variable through the medium of steel balls placed in intersecting races (Bendix, Rzeppa, Weiss, etc.), of the type used notably for actuating the driving wheels of automotive vehicles and also in the transmission of motion between parallel offset shafts.

In certain known types of universal joints a ball retainer is inserted between the heads of the movable shafts to keep the balls in position, and either four balls offset from the geometrical center of the joint constitute a minimum to permit the operation of the device, or the balls operate under abnormal shearing angle conditions; on the other hand, the longitudinal spacing between the shafts is ensured only when these shafts move toward each other, not when an effort tends to separate them, or it is also impossible to permit slight variations in the longitudinal spacing of the shafts in order to obtain "extensible" joints; finally, these known universal joints are not always perfectly homokinetic (which means that the joint is designed to maintain equal speeds of the driving and driven shafts for any angle between the shafts) and the permissible angular movement between the rotating shafts is relatively small.

Now it is the essential object of this invention to provide a strictly homokinetic universal joint operating very correctly between shafts set at an angle, even when the shafts depart considerably from their relative alignment, with the minimum wear of its component elements, this improved joint having a relatively simple structure reducing machining operations to a minimum, so that its fabrication is easier and more economical than that of any other known joint of this character. This object may be realized by employing the following means:

The assembly comprises two outer balls and a central ball moving and playing in races and cups which can be easily machined and are so disposed that the outer balls roll under a reduced angle of shearing and that the central ball operates under frictional contact conditions, a common pivot extending through these three balls and maintaining them in proper position. According to one possible embodiment of the universal homokinetic joint of this invention this pivot transmits the torque and only one central ball is utilized. Other features and advantages of the invention will become apparent from the following description referring to the attached drawings forming part of this specification and illustrating diagrammatically by way of example a few embodiments of the invention.

In the drawings:

Figure 10 is a front view of the joint half of Figs. 11 and 12;

Figure 11 is a lateral view of a modified embodiment of the universal joint of this invention which permits the relative axial movement of the shafts, the latter being shown in their nearest positions to each other;

Figure 12 is a view corresponding to Fig. 11 but showing the shafts in their remotest positions to each other;

Figure 13 is a detail view showing the central ball and the ball pivot of the joint illustrated in Figs. 10 to 12.

Figure 1:
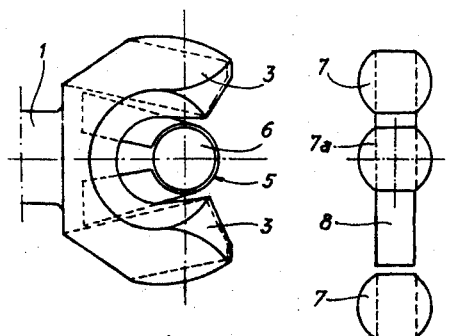
Figure 1 is a lateral view showing one half of a joint constructed in accordance with the teachings of this invention.
Figure 3:
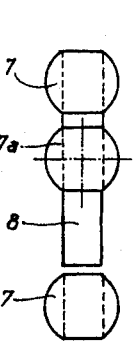
Figure 3 shows the three balls of the joint and the pivot on which they are slidably engaged.
Figure 2:
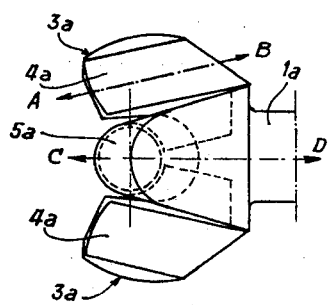
Figure 2 is a similar view showing the other half of the joint.
Figure 4:
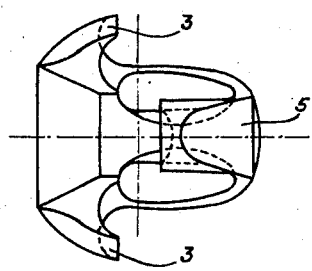
Figure 4 is a front view of the joint half illustrated in Fig. 1
Figure 5:
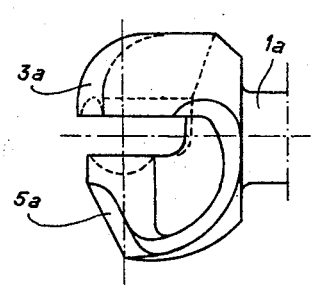
Figure 5 is a plane view of the joint half of Fig. 2.
Figure 6:
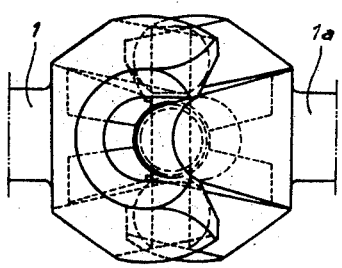
Figure 6 is a lateral view showing the three-ball homokinetic universal joint of this invention with the shafts aligned with each other.
Figure 8:
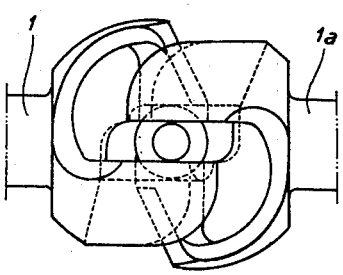
Figure 8 is a plane view from above of the joint illustrated in Fig. 6.
Figure 7:
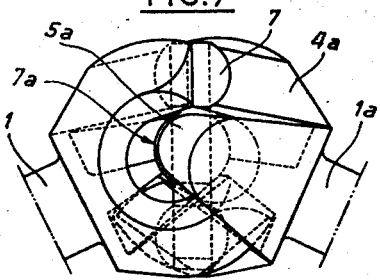
Figure 7 is a view similar to Fig. 6 but showing the shafts set at an angle to each other.
Figure 9:
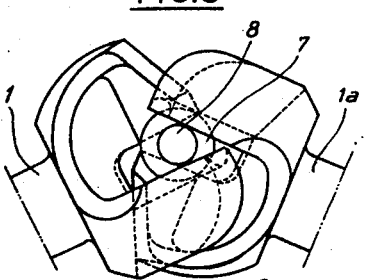
Figure 9 is a view similar to Fig. 8 but showing the shafts set at an angle in the plane of the figure.

Referring now to the drawings, and more particularly to Figs. 1 to 9 thereof, a homokinetic universal joint according to this invention comprises a first shaft end 1 having two lateral arms 3 and a central head 5, and another shaft end 1a having two lateral arms 3a and a central head 5a. These arms 3, 3a have formed therein ball races 4, 4a of semicylindrical section and having their axes A—B inclined to the axis C—D of the relevant shaft, and the central heads 5, 5a have formed therein semi-spherical cavities or cups 6 of which the centre is also the geometrical centre of the joint. Two lateral balls 7 engage the races 4, 4a and another, central ball 7a is received in the cups 6. A pivot 8 is a force fit or otherwise secured in a corresponding bore formed in the central ball 7a, but the lateral balls 7 are slidably fitted thereon. With this arrangement, the shafts 1, 1a are centered in the axial and longitudinal directions by the central ball 7a, the torque is transmitted through this ball 7a and, according to the direction of rotation, through the pivot 8 by one or the other lateral ball 7. Whatever the relative angular position of the shafts 1, 1a, the pivot 8 centered by the ball 7a is directed by the lateral balls 7 on the bisecting plane of the shafts and it is this condition that determines the homokinetic property of the universal joint of this invention.

The setting of the balls 7 on the bisecting plane of the shafts is ensured by the shearing stress (see Fig. 7) and by the hinge-like movement (see Fig. 9) of the races 4a. When the shafts 1, 1a are in axial alignment with each other (Figs. 6, 8) the device rotates as a unit without any relative displacement of the balls 7, 7a and pivot 8; if the shafts 1, 1a are inclined to each other (Figs. 7, 9) the balls 7 move in the races 4a and carry along the pivot 8 and the central ball 7a oscillates between the part-spherical cups 6.

The balls 7 and pivot 8 are inserted when the angle between the shafts 1, 1a is closed to the maximum, the central ball 7a being placed first in the cups 6.

Figures 10 to 13 illustrate a second embodiment of the joint of this invention, of which the essential feature is that it is extensible. To this end the arms 43, 43a and heads 45 are somewhat longer, each central head 45 having a longitudinal race 46, 46a of semi-cylindrical section formed therein as a substitute for the cup of the preceding embodiment, this race being parallel to the axis of the relevant shaft end 41 or 41a so that the relative longitudinal spacing of these shaft ends may be varied, as the ball 47a may roll in its races 46, 46a like the eccentric balls 47 in their relevant races 44. The axial centering of shafts 41, 41a is still ensured by the central ball 47a which constitutes the centre of the homokinetic universal joint irrespective of the angular setting of the movable shafts. This central ball 47a may be fastened to the pivot 48 by a diametral pin 50, if desired. A tapered shaft end 49 may engage the shaft end 41.

Although the above description and the accompanying drawings relate to a few typical embodiments of the invention, it will be readily understood that these are given by way of example only and should not be construed as limiting the field of this invention as many modifications may be brought to these embodiments without departing from the spirit and scope of the invention as set forth in the appended claims.

What I claim as new is:

1. A universal joint adapted to maintain equal speeds of driving and driven shafts for any angle between said shafts comprising a first shaft end and a second shaft end each formed with a central head and two lateral arms, a rectilinear ball race formed in each of said lateral arms and inlined to the axis of the relevant shaft, said races being positioned symmetrically to each other, an outer ball inserted in each of said ball races in a shearing position, a part-spherical hollow cup formed in said central head and receiving a central ball constituting the geometrical centre of the joint while ensuring the axial and longitudinal centering of said first and second shaft ends, a pivot extending through said outer and central balls with a force fit in said central ball and a slide fit in said outer balls, whereby said pivot is constantly held by said shear-stressed outer balls in the bisecting plane of said movable shafts irrespective of the relative angular position of said shafts.

2. A universal joint adapted to maintain equal speeds of driving and driven shafts for any angle between said shafts comprising a first shaft end and a second shaft end each formed with a central head and two lateral arms, a rectilinear ball race formed in each of said lateral arms and inclined to the axis of the relevant shaft, said races being positioned symmetrically to each other, an outer ball inserted in each of said ball races in a shearing position, another rectilinear ball race aligned on the axis of the relevant shaft end in said central head, a third ball intermediate said outer balls and located in said other ball race to constitute the geometrical centre of the joint when said first and second shaft ends are assembled with the corresponding ball races thereof registering with each other and receiving said outer and central balls, a pivot extending through said outer and central balls with a force fit in said central ball and a slide fit in said outer balls, whereby said pivot is constantly held by said shear-stressed outer balls in the bisecting plane of said movable shafts irrespective of the relative angular and longitudinal positions of said shafts.

3. A universal joint adapted to maintain equal speeds of driving and driven shafts for any angle between said shafts comprising a first shaft end and a second shaft end having variable relative angular positions, a central ball, the center of which constitutes the geometrical center of the joint, two lateral balls and a spindle connecting said central ball to both said lateral balls, said central ball being fixed to said spindle and said lateral balls being slidable thereon, said shafts being each provided with three arms in which are formed ball races, at least two of which are rectilinear and of a semi-cylindrical section, said three balls being housed between said ball races, said spindle constantly holding said lateral balls in the bisecting plane of the shafts and the torque being transmitted by the central ball concurrently with and successively by one of the two lateral balls.

4. The joint of claim 3 wherein the ball races for the central ball are semi-spherical in shape, whereby the central ball besides acting as a torque transmitting member, axially and longitudinally centers the shafts.

5. The joint of claim 3, wherein the ball races enclosing the central ball are also rectilinear, of a semi-cylindrical section and parallel to the geometrical axis of their respective shaft, whereby the joint is extensible.

References Cited in the file of this patent

UNITED STATES PATENTS

| 1,774,578 | Weiss | Sept. 2, 1930 |
| 2,051,248 | Dunn | Aug. 18, 1936 |
| 2,462,700 | Wingquist | Feb. 22, 1949 |
| 2,737,790 | Bellomo | Mar. 13, 1956 |

FOREIGN PATENTS

| 565,099 | Germany | Nov. 26, 1932 |
| 798,202 | France | Mar. 2, 1936 |